March 26, 1968  H. LUDWIG  3,374,504
MOLD ASSEMBLY WITH COMPOSITE SOLE PLATE
FOR DOUBLE INJECTION
Filed April 11, 1966
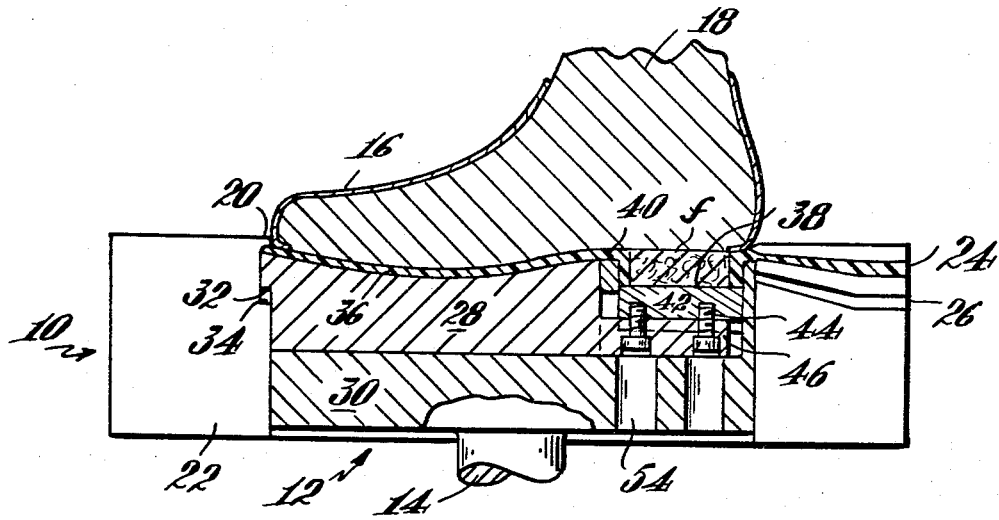
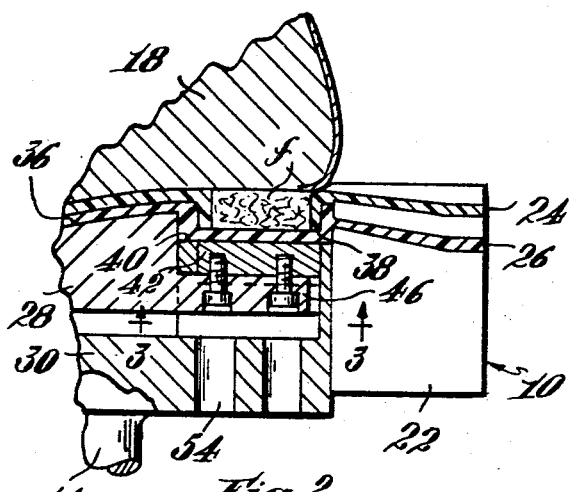
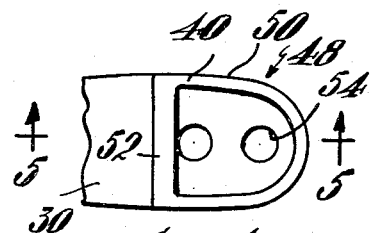
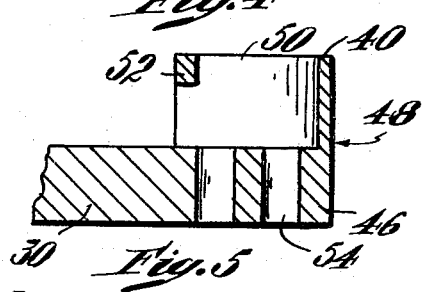
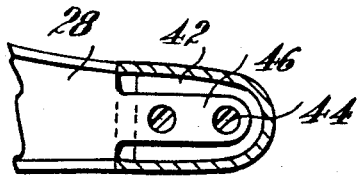
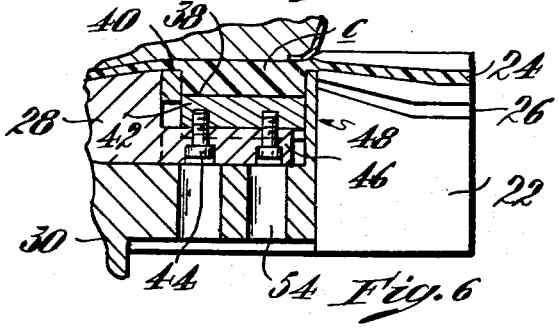
Inventor
Herbert Ludwig
by Roberts, Cushman & Grover
Attys United States Patent Office 3,374,504
Patented Mar. 26, 1968

3,374,504
MOLD ASSEMBLY WITH COMPOSITE SOLE
PLATE FOR DOUBLE INJECTION
Herbert Ludwig, Desmastr. 112, Usen, near
Bremen, Germany
Filed Apr. 11, 1966, Ser. No. 547,060
14 Claims. (Cl. 18—42)

This invention relates to injection molding assemblies and especially to mold assemblies designed for double injection of a bottom comprising an insole and outsole.

In order to form multi-ply bottoms with layers of different thickness at different portions of the bottom, such as at the forepart, shank and heel, and to enable including at the forepart or heel a filler or core, a mold assembly was designed as illustrated in my pending application Ser. No. 433,146, filed Feb. 16, 1965, now Patent No. 3,305,895, having a sole plate movable relative to the side ring and a part recessed into the sole plate and fixed relative to the side ring so that by movement of the sole plate relative to the side ring and the part recessed therein, the surface of the sole plate could be disposed at a distance from the bottom of the lasted upper corresponding to that of the fixed part or at a different distance. The sole plate in the aforesaid assembly contained an injection passage longitudinally thereof and openings from the injection passage into the mold cavity thus imposing limitations on the construction of the sole plate and the location of the recessed part relative to the bottom. The mold assembly of this invention is designed to afford the advantages of the assembly shown in the aforesaid application without its disadvantages, to simplify the construction and to improve operation.

As herein illustrated, the invention resides in a mold assembly comprising a side ring and a composite sole plate, embodying a part having a surface confronting a predetermined area of the bottom of the shoe, and two parts having areas which collectively confront another predetermined area of the bottom. The several parts are supported for movement relative to the bottom to position the parts at the same or different distances from the bottom and preferably to enable placing the parts collectively in a first position with the one part and one of the other parts at a predetermined distance from the bottom, and with the other of the other parts at a different distance, and of then moving the parts collectively to a second position in which the one part is at a greater distance from the bottom and the other parts are at the same distance from the bottom but at a greater distance than the one part. As illustrated, the one part confronts the forepart of the bottom and the other parts confront the heel and comprise a core plate and a ring encircling the core plate. The parts are formed on superposed plates comprising an upper plate on which the part confronting the forepart and the core plate are mounted and on a lower plate on which the ring is mounted. A ram secured to the lower plate provides for moving the plates in unison toward the bottom and shoulders on the upper plate and the side ring provides, by interengagement, means for limiting the lowermost position of the upper plate. The core plate is removably fastened to the upper plate and the lower plate contains an opening through which access may be had to remove and replace the core plate.

The invention will now be described in greater detail with reference to the accompanying drawings wherein:

FIG. 1 is a vertical section taken longitudinally of the mold assembly, showing the sole plate elevated for injection of an insole and heel core cover;

FIG. 2 is a fragmentary vertical section of the mold assembly with the sole plate lowered for injection of an outsole and heel;

FIG. 3 is a horizontal section taken on the line 3—3 of FIG. 2;

FIG. 4 is a fragmentary plan view of the composite sole plate at the heel;

FIG. 5 is a vertical section taken on the line 5—5 of FIG. 4; and

FIG. 6 is a fragmentary vertical section of the mold assembly at the heel end showing the sole plate elevated for injection of an insole and a heel core.

The mold assembly as herein illustrated comprises a side ring 10 and composite sole plate 12, the latter being supported at the upper end of a ram 14 for movement relative to the side ring and to the bottom of a lasted upper 16 supported by a last 18 with the bottom resting upon a lip 20 circumferentially of the open top of the side ring. The side ring is slit longitudinally, only one-half being shown herein, and the confronting surfaces 22 of each half each contain one-half of two injection openings 24 and 26.

The composite sole plate 12 is comprised of superposed plates 28 and 30, respectively. The lower plate 30 is fixed to the ram 14 and is movable thereby toward and away from the bottom of the lasted upper. The upper plate 28 has a downwardly facing shoulder 32 which, by engagement with an upwardly facing shoulder 34 on the side ring, limits its downward movement relative to the bottom of the lasted shoe. Upward movement of the upper plate is produced by upward movement of the lower plate.

The plates 28 and 30 provide a surface 36 confronting the forepart and corresponding in area thereto and surfaces 38 and 40 which confront the heel and collectively correspond in area thereto. The surface 36 is constituted by the upper surface of the plate 28 and the surface 38 by the upper surface of a block 42 fastened by bolts 44 to a rearwardly extending portion 46 of the plate 28. The surface 38 is located below the level of the surface 36 by an amount corresponding substantially to the vertical distance between the tread surfaces of the outsole and heel to be formed. The upper surface of the block 42 is of smaller area than the heel, preferably corresponding substantially in area to the lower surface of the heel core or filler employed at the heel end of the upper. The surface 40 is constituted by the upper surface of a ring 48 encircling the block 42 and comprises a substantially U-shaped part formed at the rear end of the plate 30 having side walls 50 rising therefrom at opposite sides of the block 42 and its supporting extension which extend upwardly therefrom substantially to the level of the rear end of the surface 36 when the plates 28 and 30 are in engagement. A part 52 having a vertical dimension not greater than the thickness of the block 42 extends across the open ends of the U-shaped part with the surface at its upper edge in the plane of the surface at the upper edge of the U-shaped part.

To enable removing and replacing the block 42 with a block of different size, the plate 32 is provided with openings 54 below the bolts 44 so that access may be had through these holes to the heads of the bolts for removing them and thus permitting the block to be removed and replaced by another.

As thus constructed, a shoe embodying an insole, filler outsole and heel is made by replacing the lasted upper 16 on the lip 20 at the top of the side ring and then raising the composite sole plate comprising the two plates 28 and 30 to the position shown in FIGURE 1, with the block 42 pressed against the lower surface of the filler *f*. As herein illustrated in FIGS. 1 and 2, the filler *f* is smaller in cross-sectional area than the inside of the ring 48. In this position, surfaces 36, 38 and 40 are situated below the bottom of the lasted upper so that a shallow cavity corresponding in depth to the thickness of the insole to be formed is provided between the bottom of the upper and the surface 36 throughout the entire area of the forepart, and a deep cavity corresponding in depth to the thickness of the filler is provided between the bottom of the upper and the surface 38 at the heel which extends all the way around the filler between the ring and the filler. In this position of the sole plate, the injection passage 26 is closed by the ring 48 which covers it and injection is made through the passage 24 to fill the shallow cavity at the forepart and the deep cavity at the heel to form, respectively, an insole and a cover around the filler.

Following the first injection, the composite sole plate is lowered by lowering the plate 30 until the shoulder 32 and the plate 28 engages the shoulder 34 on the side ring 10. Thereafter the plate 30 is moved downwardly relative to the plate 28 to bring the upper surface 40 of the ring 48 into a common plane with the upper surface 38 of the block and to position both of these surfaces below the lower surface of the filler by an amount corresponding substantially to the distance between the lower surface of the insole and the surface 36. In this position of the surfaces 36, 38 and 40 a shallow cavity is provided below the insole for formation of an outsole and a deep cavity is provided surrounding the sides and below the bottom of the filler for forming a heel, access to which is afforded through the injection passage 26. The injection passage 24 is, of course, blocked off at this time by the first injected elastomer.

If desired, the filler f may be omitted and a heel core c of elastomer may be injected during the first injection, as shown in FIG. 6. When this is done it is desirable to make the first injection for the insole and heel core of one kind of elastomer and the outsole and heel of another, for example a soft inexpensive elastomer for the insole and heel core and a dense wear-resistant elastomer for the outsole and heel.

While the invention is illustrated in conjunction with the use of a heel filler or heel core at the heel end of the shoe, it is evident that a corresponding arrangement of the mold parts could be easily adapted for employing a filler or core piece at the forepart of any other portion of the shoe bottom. The filler may be felt, cork or any other material customarily used for this purpose and the inner sole and core piece may be made porous by injecting a foamed elastomer.

The mold assembly as illustrated is designed so that lowering of the part 28 is limited by engagement of the shoulders 32 and 34 and hence to a precisely controlled predetermined maximum thickness for the bottom. Upward movement of the part 28 however is not so limited and hence the composite thickness of the outsole may be varied as desired within the maximum limit established by the interengagement of the shoulders 32 and 34.

It should be understood that the present disclosure is for the purpose of illustration only and that this invention includes all modifications and equivalents which fall within the scope of the appended claims.

I claim:

1. A mold assembly comprising a side ring and a composite sole plate, said sole plate embodying a part having a surface confronting the bottom at the forepart and corresponding in area thereto, and parts having surfaces confronting the bottom at the heel which collectively correspond in area to the heel part, said sole plate being supported for movement from a first position in which the surface of the part confronting the forepart and the surface of one of the parts confronting the heel are at a corresponding distance from the bottom, and the other part is at a different distance, and to a second position in which the surfaces of the parts confronting the heel are at a corresponding distance from the bottom and the surface of the part confronting the forepart is at a different distance.

2. A mold assembly according to claim 1, characterized in that the part confronting the forepart and one of the parts confronting the heel may be placed at a corresponding distance from the bottom and alternatively the parts confronting the heel may be placed at a corresponding distance from the bottom.

3. A mold assembly according to claim 1, wherein the part having the surface confronting the forepart and one of the parts having a surface confronting the heel are movable in unison relative to the bottom of the shoe, and the other part is movable relative to the part confronting the forepart and the one part confronting the heel.

4. A mold assembly according to claim 1, wherein the surface of the part confronting the forepart and the surface of one of the parts confronting the heel are situated at different distances from the bottom of the shoe, and the other part confronting the heel is movable relative to the part confronting the forepart and said one part to dispose its surface at the level of the part confronting the forepart or the surface of said one part.

5. A mold assembly according to claim 1, wherein the parts confronting the heel are a core and ring, the surface of the core being situated at a level below the surface of the part confronting the forepart in relation to the bottom of the shoe, and the surface of the ring being positionable at the same relative level as the surface of the part confronting the forepart or the surface of the core.

6. A mold assembly according to claim 1, wherein the part confronting the forepart embodies an extension at the heel end to which one of the parts confronting the heel is secured, and the other part confronting the heel embodies a support coextensive with the part confronting the forepart and said one part which supports all of said parts for movement in unison toward the bottom of the shoe.

7. A mold assembly according to claim 1, wherein there is means for limiting movement of the part confronting the forepart and said one of the parts confronting the heel away from the bottom of the shoe, and wherein the support embodied in said other of the parts confronting the heel is movable relative to the part confronting the forepart and said one part at the limited position of the latter.

8. A mold assembly according to claim 1, wherein the sole plate embodies superposed plates comprising an upper plate on which is formed the part confronting the forepart and one of the parts confronting the heel, and a lower plate on which is formed the other part confronting the heel, there is means connected to the lower plate operable to raise the plates in unison toward the bottom of the shoe, and there are shoulders on the upper plate and on the inside of the mold interengageable as the sole plate is lowered to limit movement of the upper plate away from the bottom to a predetermined distance therefrom.

9. A mold assembly according to claim 1, wherein the sole plate embodies superposed plates comprising an upper plate on which is formed the part confronting the forepart and one of the parts confronting the heel, and a lower plate on which is formed the other part confronting the heel, said upper plate being movable between the bottom of the shoe and a lower limit below the bottom of the shoe, and said lower plate being movable relative to the upper plate between the bottom of the shoe and a position below the lower limited position of the upper plate.

10. A mold assembly according to claim 1, wherein the sole plate embodies superposed plates comprising an upper plate on which is formed the part confronting the forepart, and one of the parts confronting the heel, and a lower plate on which is formed the other part confronting the heel, said plates when elevated providing a mold cavity below the bottom for receiving an injection of an insole forwardly of the heel and a core at the heel and when lowered to provide a mold cavity below the insole and heel core for receiving an injection of an outsole and a heel cover.

11. A mold assembly according to claim 1, wherein the sole plate embodies superposed plates, an upper plate on which is formed the part confronting the forepart and a core plate confronting the heel, said core plate being of smaller area than the heel, and a lower plate on which is formed a ring confronting the heel, said ring encircling the core plate and providing in conjunction therewith, when at the same level as the core plate, a composite surface corresponding in area to the heel, said plates being movable in unison toward the bottom to place the part confronting the forepart and the ring at a corresponding distance from the bottom and the core plate at a greater distance to provide a cavity for injection of an insole and a heel core, and movable away from the bottom to a position in which the part confronting the forepart is spaced below the insole and the core plate and ring are spaced below the heel core, providing a cavity beneath the insole and a cavity around and beneath the heel core for injection of an outsole and heel.

12. A mold assembly according to claim 1, wherein the sole plate embodies superposed plates, an upper plate on which is formed the part confronting the forepart and a core plate confronting the heel, said core plate being of smaller area than the heel, and a lower plate on which is formed a ring confronting the heel, said ring encircling the core plate and providing in conjunction therewith, when at the same level as the core plate, a composite surface corresponding in area to the heel, said plates being movable in unison toward the bottom to a position in which the part confronting the forepart and the ring are spaced from the bottom a corresponding distance and form in conjunction with the bottom a shallow cavity for receiving an injection of an elastomer to form an insole, and the core plate is at a greater distance from the bottom and forms in conjunction with the bottom a deep cavity for receiving an injection of elastomer to form a heel core, and away from the bottom to lower the part confronting the forepart relative to the insole to form a shallow cavity for receiving an injection of elastomer to form an outsole and the ring and core plate relative to the core to form a cavity around and beneath the core for receiving an injection of elastomer to form a heel.

13. A mold assembly according to claim 8, wherein the part confronting the heel formed on the upper plate is removably attached thereto, and the lower part contains an opening through which access may be had to the removable part to effect removal thereof.

14. A mold assembly comprising a side ring and a composite sole plate, said sole plate embodying parts which have surfaces confronting the bottom, said surfaces collectively corresponding in area to the bottom of the shoe, and said parts being relatively movable in each of two positions to form with the bottom cavities of different depth for receiving a first injection of an elastomer of one kind and a second injection of an elastomer of another kind, in one position to place two of the surfaces at the same distance from the bottom and the other at a different distance and in the other position to place one of the two and the other at the same distance from the bottom and the other one of the two at a different distance.

References Cited
UNITED STATES PATENTS 3,160,921 12/1964 Ludwig.
3,305,895 2/1967 Ludwig.
3,319,301 5/1967 Ludwig.
3,343,223 9/1965 Ludwig.

J. HOWARD FLINT, JR., *Primary Examiner.*